US012681634B2

(12) United States Patent
Kim

(10) Patent No.: US 12,681,634 B2
(45) Date of Patent: Jul. 14, 2026

(54) METHOD FOR PROVIDING CORRECTED STROKE INPUT AND DISPLAY DEVICE THEREOF

(71) Applicant: SAMSUNG ELECTRONICS CO., LTD., Suwon-si (KR)

(72) Inventor: Hongjae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 171 days.

(21) Appl. No.: 18/406,961

(22) Filed: Jan. 8, 2024

(65) Prior Publication Data

US 2025/0138723 A1      May 1, 2025

Related U.S. Application Data

(63) Continuation of application No. PCT/KR2023/017282, filed on Nov. 1, 2023.

(30) Foreign Application Priority Data

Jan. 10, 2023     (KR) ........................ 10-2023-0003474

(51) Int. Cl.
*G06F 3/04883*          (2022.01)
*G06F 3/041*            (2006.01)
(52) U.S. Cl.
CPC ........ *G06F 3/04883* (2013.01); *G06F 3/0412* (2013.01)
(58) Field of Classification Search
CPC ........................... G06F 3/04883; G06F 3/0412
See application file for complete search history.

(56) References Cited

U.S. PATENT DOCUMENTS

| | | | |
|---|---|---|---|
| 9,374,547 B2 | 6/2016 | Lee et al. | |
| 9,652,679 B2 * | 5/2017 | Yang ..................... | G06F 3/0482 |
| 10,169,648 B2 * | 1/2019 | Fei ........................ | G06V 30/153 |
| 10,235,897 B2 | 3/2019 | Winnemoeller et al. | |

(Continued)

FOREIGN PATENT DOCUMENTS

| | | | |
|---|---|---|---|
| EP | 0990994 A2 | 4/2000 | |
| JP | 2015-191044 A | 11/2015 | |

(Continued)

OTHER PUBLICATIONS

International Search Report dated Jan. 31, 2024 issued by the International Searching Authority in International Application No. PCT/KR2023/017282.

(Continued)

*Primary Examiner* — Andrea C Leggett
(74) *Attorney, Agent, or Firm* — Sughrue Mion, PLLC

(57)          ABSTRACT

A display device includes a display including a touchscreen, and at least one processor configured to: identify letter areas corresponding to letters provided on the touchscreen; based on receiving a stroke input on the letter areas through the touchscreen, set the letter areas where the stroke input is received as areas of interest; identify a start area corresponding to a start point of the stroke input; identify a last area corresponding to an end point of the stroke input; generate a line input continuing from the start area to the second area; and control the display to display the generated line input on the touchscreen.

20 Claims, 11 Drawing Sheets

(56)                    References Cited

U.S. PATENT DOCUMENTS

| | | | |
|---|---|---|---|
| 10,402,085 B2 | 9/2019 | Tsukahara et al. | |
| 10,684,772 B2 * | 6/2020 | Murakawa | G06F 3/04883 |
| 2003/0174907 A1 | 9/2003 | Kanemoto et al. | |
| 2017/0249293 A1 * | 8/2017 | Couelier | G06V 30/387 |
| 2018/0081535 A1 | 3/2018 | Murakawa | |
| 2020/0319848 A1 * | 10/2020 | Kim | G06F 3/165 |
| 2021/0350122 A1 * | 11/2021 | Dixon | G06V 30/36 |
| 2022/0083216 A1 | 3/2022 | Xia et al. | |
| 2022/0284169 A1 * | 9/2022 | Jindal | G06F 3/04847 |
| 2023/0185448 A1 | 6/2023 | Kwak et al. | |

FOREIGN PATENT DOCUMENTS

| | | | |
|---|---|---|---|
| JP | 2018-49319 | A | 3/2018 |
| JP | 6287861 | B2 | 3/2018 |
| KR | 10-1123837 | B1 | 3/2012 |
| KR | 10-2014-0110356 | A | 9/2014 |
| KR | 10-2015-0049176 | A | 5/2015 |
| KR | 10-1589247 | B1 | 1/2016 |
| KR | 10-2017-0105106 | A | 9/2017 |
| KR | 10-2018-0137845 | A | 12/2018 |
| KR | 10-1967632 | B1 | 4/2019 |
| KR | 10-2020-0000300 | A | 1/2020 |
| KR | 10-2257248 | B1 | 5/2021 |
| KR | 10-2022-0017063 | A | 2/2022 |
| KR | 10-2022-0017290 | A | 2/2022 |
| KR | 10-2022-0170212 | A | 12/2022 |
| WO | 2014/189812 | A2 | 11/2014 |

OTHER PUBLICATIONS

Written Opinion dated Jan. 31, 2024 issued by the International Searching Authority in International Application No. PCT/KR2023/017282.
Communication dated Jan. 20, 2026 issued by the European Patent Office in European Patent Application No. 23916390.0.

* cited by examiner

METHOD FOR PROVIDING CORRECTED STROKE INPUT AND DISPLAY DEVICE THEREOF

CROSS-REFERENCE TO RELATED APPLICATIONS

This application is a continuation application of International Application No. PCT/KR2023/017282 designating the United States, filed on Nov. 1, 2023, in the Korean Intellectual Property Receiving Office, which claims priority from Korean Patent Application No. 10-2023-0003474, filed on Jan. 10, 2023, in the Korean Intellectual Property Office, the disclosures of which are incorporated by reference herein in their entireties.

BACKGROUND

1. Field

The disclosure relates to a method for providing corrected stroke input and a display device thereof and, more specifically, to a method for correcting a line input applied to a letter area to be suitable for the letter area and displaying the corrected line input on a display, and a display device for implementing the same.

2. Description of Related Art

With the development of digital technology, various types of electronic devices, such as mobile communication terminals, personal digital assistants (PDAs), electronic schedulers, smartphones, tablet personal computers (PCs), and wearable devices, are in wide use. To support and increase functions, hardware parts and/or software parts of electronic devices are continuously being enhanced.

For example, electronic devices provide a function that allows the user to write necessary memos anytime, anywhere without a notebook or pen. For example, the user may write directly on a display (e.g., a touchscreen) by hand or using an electronic pen. The electronic device may receive a touch trajectory (or coordinates) of a touch (or contact) on the display as handwriting. The user may use an electronic pen to conveniently write a memo with a retro feel like she would do on a notebook with a normal pen.

SUMMARY

According to an aspect of the disclosure, there is provided a display device including: a display including a touchscreen; and at least one processor operatively connected with the display, wherein the at least one processor is configured to: identify letter areas corresponding to letters provided on the touchscreen; based on receiving a stroke input on the letter areas through the touchscreen, set the letter areas where the stroke input is received as areas of interest; identify a start area corresponding to a start point of the stroke input among the areas of interest; identify a last area corresponding to an end point of the stroke input among the areas of interest; generate a line input continuing from the start area to the last area, the line input being generated to pass through one or more intermediate areas positioned between the start area and the last area among the areas of interest; and control the display to display the generated line input on the touchscreen.

The at least one processor may be further configured to identify the letter areas as rectangular areas surrounding respective letters.

The start point of the stroke input corresponds to a first area element of the start area, and the end point of the stroke input corresponds to a second area element of the last area, The line input is generated to pass through one or more third area elements of the one or more intermediate areas based on at least one of the first area element or the second area element, Each of the first area element or the second area element may be identified as one of an upper area element, an intermediate area element, a lower area element, or a bottom area element.

Each of the one or more third area elements corresponds to an area element identified for the first area element or the second area element.

The stroke input received on the touchscreen may include one of a shading stroke input or a solid line stroke input, and wherein the at least one processor may be further configured to, based on receiving the shading stroke input in the letter areas, set the line input as a shading line input and, based on receiving the solid line stroke input in the letter areas, set the line input as a solid line input.

The at least one processor may be further configured to, based on the stroke input received in the letter areas being the shading stroke input, identify the shading line input as having a line thickness that is the same as the line thickness of the shading stroke input, and wherein the line thickness of the shading line input is the same from the first area element of the start area to the second area element of the last area.

The at least one processor may be further configured to: based on the stroke input received in the letter areas being the shading stroke input, identify the shading line input as having the same line thickness as the shading stroke input, set the shading line input to have a line thickness extended by the same length in upper and lower directions of a central line, and set the central line to pass through a central axis of the first area element of the start area and a central axis of the second area element of the last area.

The at least one processor may be further configured to, based on the stroke input received in the letter areas being the shading stroke input, generate the shading line input to at least partially fill the one or more third area elements set to allow the shading line input to pass through.

The at least one processor may be further configured to, based on the stroke input received in the letter areas being the solid line stroke input, identify the solid line input as having a same thickness as the solid line stroke input, and identify the thickness of the solid line input as being the same from the first area element of the start area to the second area element of the last area.

The at least one processor may be further configured to generate the solid line input to pass through the bottom area element of each of the areas of interest based on the first area element where the start point of the solid line stroke input is applied and the second area element where the end point of the solid line stroke input is applied being identified as the lower area element.

The at least one processor may be further configured to map checker information to the solid line input based on the first area element where the start point of the solid line stroke input is applied and the second area element where the end point of the solid line stroke input is applied being identified as the intermediate area element.

The at least one processor may be further configured to control the display to display the solid line stroke input on the touchscreen, without displaying the solid line input, based on the first area element where the solid line stroke input is applied being identified as any one of the upper area element or the lower area element and the second area element where the end point of the solid line stroke input is applied being identified as a remaining one of the upper area element or the lower area element.

The at least one processor may be further configured to, in displaying the generated line input on the touchscreen, control the display to display the stroke input and the line input on the touchscreen while the stroke input on the touchscreen is maintained to the end point of the stroke input.

The at least one processor may be further configured to control the display to display the line input on the touchscreen, with the stroke input omitted from the touchscreen, based on the stroke input being stopped.

The at least one processor may be further configured to control the display to represent the line input as a straight line in the first area element of the start area, the one or more third area elements of the one or more intermediate areas, and the second area element of the last area, and represent the line input as a straight line, a curve, or a combination of the straight line and the curve, between the areas of interest that are adjacent.

According to an aspect of the disclosure, there is provided a method for providing a corrected stroke input by a display device, the method including: identifying letter areas corresponding to letters provided on a touchscreen; based on receiving a stroke input on the letter areas through the touchscreen, setting the letter areas where the stroke input is received as areas of interest; identifying a start area corresponding to a start point of the stroke input among the areas of interest, and a last area corresponding to an end point of the stroke input among the areas of interest; generating a line input continuing from the start area to the last area, the line input being generated to pass through a third area element or a fourth area element of one or more intermediate areas positioned between the start area and the last area among the areas of interest; and displaying the generated line input on the touchscreen.

According to an aspect of the disclosure, there is provided a display device, including: at least one memory configured to store instructions; and at least one processor configured to execute the instructions to: identify letter areas corresponding to letters provided on a touchscreen; based on receiving a stroke input on the letter areas through the touchscreen, set the letter areas where the stroke input is received as areas of interest; identify a start area corresponding to a start point of the stroke input among the areas of interest; identify a last area corresponding to an end point of the stroke input among the areas of interest; generate a line input continuing from the start area to the last area, the line input being generated to pass through one or more intermediate areas positioned between the start area and the last area among the areas of interest; and control a display to display the generated line input on the touchscreen.

The at least one processor may be further configured to identify the letter areas as rectangular areas surrounding respective letters.

The start point of the stroke input corresponds to a first area element of the start area, and the end point of the stroke input corresponds to a second area element of the last area.

The line input is generated to pass through one or more third area elements of the one or more intermediate areas based on at least one of the first area element or the second area element, Each of the first area element or the second area element is identified as one of an upper area element, an intermediate area element, a lower area element, or a bottom area element.

Each of the one or more third area elements corresponds to an area element identified for the first area element or the second area element.

The stroke input received on the touchscreen may include one of a shading stroke input or a solid line stroke input, and wherein the at least one processor may be further configured to, based on receiving the shading stroke input in the letter areas, set the line input as a shading line input and, based on receiving the solid line stroke input in the letter areas, set the line input as a solid line input.

The at least one processor may be further configured to, based on the stroke input received in the letter areas being the shading stroke input, identify the shading line input as having a line thickness that is the same as the line thickness of the shading stroke input, and wherein the line thickness of the shading line input is the same from the first area element of the start area to the second area element of the last area.

BRIEF DESCRIPTION OF THE DRAWINGS

The above and other aspects, features, and advantages of certain embodiments of the disclosure will be more apparent from the following description taken in conjunction with the accompanying drawings, in which.

Figure 1:
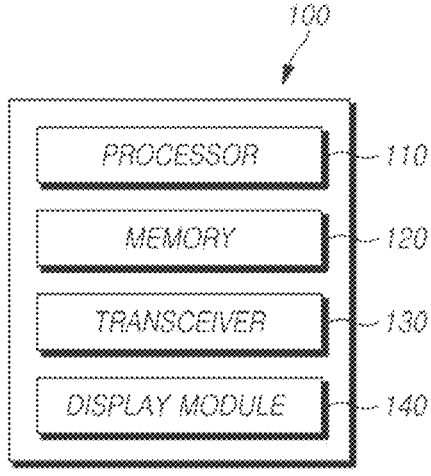
FIG. 1 is a block diagram illustrating a display device, according to one or more embodiments of the disclosure.

Reference may be made to the accompanying drawings in the following description, and specific examples that may be practiced are shown as examples within the drawings. Other examples may be utilized and structural changes may be made without departing from the scope of the various examples.

DETAILED DESCRIPTION

Embodiments of the disclosure are described below with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. For clarity and brevity, no description is made of well-known functions and configurations in the drawings and relevant descriptions.

FIG. 1 is a block diagram illustrating a display device according to one or more embodiments of the disclosure.

A display device 100 according to one or more embodiments of the disclosure may include a processor 110, a memory 120, a transceiver 130, and a display module (or display) 140. The memory 120, the transceiver 130, and the display module 140 may be electrically or functionally connected to the processor 110. The processor 110 may control components constituting the display device 100 by generating and/or transmitting a control command.

According to one or more embodiments of the disclosure, the processor 110 may include a storage and processing circuit unit for supporting the operation of the display device 100. The storage and processing circuit unit may include storage, such as non-volatile memory (e.g., flash memory, or other electrically programmable read only memory (ROM) configured to form a solid state drive (SSD)) or volatile memory (e.g., static or dynamic random access memory (RAM)). The processing circuit unit in the processor 110 may be used to control the operation of the display device 100. The processing circuit unit may be based on one or more microprocessor(s), microcontroller(s), digital signal processor(s), baseband processor(s), power management section(s), audio chip(s), or application specific integrated circuit(s).

According to one or more embodiments of the disclosure, the memory 120 may include a memory area for one or more processors 110 for storing variables used in the protocol, configuration, control, and other functions of the display device 100, including operations corresponding to or including any one of the methods and/or procedures described as an example in the disclosure. The memory 120 may include non-volatile memory, volatile memory, or a combination thereof. The memory 120 may interface with a memory slot that enables insertion and removal of removable memory cards in one or more formats (e.g., secure digital (SD) card, Memory stick, compact flash, etc.).

According to one or more embodiments of the disclosure, the transceiver 130 may include a wireless communication module or a radio frequency (RF) module. The wireless communication module may include, for example, Wi-Fi, Bluetooth (BT), global positioning system (GPS) or near field communication (NFC). For example, the wireless communication module may provide a wireless communication function using a radio frequency. Additionally or alternatively, the wireless communication module may include a network interface or modem for connecting the display device 100 with a network (e.g., Internet, local area network (LAN), wide area network (WAN), telecommunication network, cellular network, satellite network, plain old telephone service (POTS) or 5G network). The RF module may be responsible for data transmission/reception, e.g., transmitting and receiving data RF signals or invoked electronic signals. As an example, the RF module may include, e.g., a power amp module (PAM), a frequency filter, or a low noise amplifier (LNA). The RF module may further include parts (e.g., conductors or wires) for communicating radio waves in a free space upon performing wireless communication.

In an embodiment, the display module 140 may include at least one of a liquid crystal display (LCD), a thin film transistor-liquid crystal display (TFT-LCD), an organic light-emitting diode (OLED), a flexible display, or a three-dimensional (3D) display). Some of the displays may be configured in a transparent type or light-transmissive type allowing the outside to be viewed therethrough. This may be called a transparent display, and a representative example of the transparent display is a transparent OLED (TOLED). A rear structure of the display module 140 may also be configured as a light transmissive structure.

There may be two or more display modules 140 according to the implementation of the display device 100. For example, a plurality of display modules may be arranged integrally or spaced apart from each other on one surface of the display device 100 or may be arranged on their respective corresponding surfaces of the mobile terminal 1.

When the display module 140 and a sensor for detecting a touch motion (e.g., a 'touch sensor') form a mutually layered structure (e.g., a 'touchscreen'), the display module 140 may be used as an input device as well as an output device. The touch sensor may have a form of, e.g., a touch film, a touch sheet, or a touch pad. The touch sensor may be configured to convert the pressure applied to a specific portion of the display module 140 or a variation in the capacitance occurring in the specific portion of the display module 140 into an electrical input signal. The touch sensor may be configured to be able to detect the pressure upon touching, as well as the position and area of the touch. Where there is a touch input to the touch sensor, a signal(s) corresponding thereto is sent to the processor 110. The processor 110 may be aware what area has been touched in the display module 140.

Figure 2:
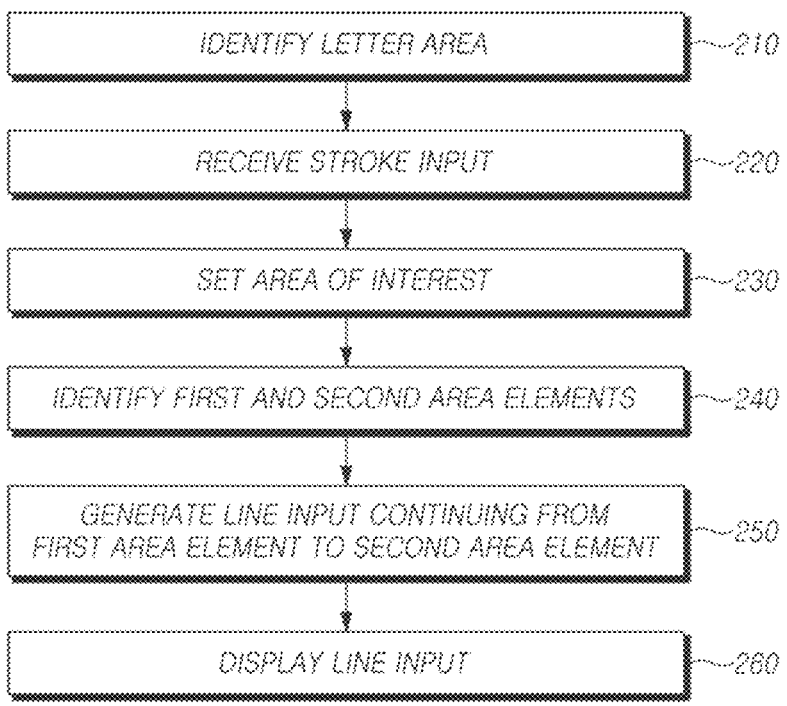
FIG. 2 is a flowchart illustrating a method for providing a corrected stroke input, according to one or more embodiments of the disclosure.

FIG. 2 is a flowchart illustrating a method for providing a corrected stroke input according to one or more embodiments of the disclosure.

Referring to FIG. 2, the display device may perform a plurality of operations to provide a corrected stroke input. The display device may be substantially the same as the display device 100 of FIG. 1, and each operation may be supported by the processor 110 of the display device 100.

The operations described below may be implemented in a state in which a line input correction function is enabled and may not be implemented in a state in which the line input correction function is disabled. If the conditions in operation 210 to operation 260 below are not met, the display device may not execute the line input correction function or display the stroke input to the touchscreen as it is.

Accordingly, the user may display a line input having substantially the same line thickness as a preset line thickness for a stroke input, on the letter area.

The screen on which the touchscreen is displayed may include letters input in various ways. For example, the letters may be input based on a user input to a keyboard or a touchscreen. The letters may be included as part of an image although not input through the keyboard or touchscreen.

The display device may identify the letters being represented on the touchscreen, and further identify a letter area corresponding to the letters. The display device may classify various strokes into letters or non-letters, and set an area corresponding to the letter as a letter area. A pre-trained machine learning model may be used to classify strokes into letters and non-letters, and the machine learning model may be pre-trained with letters mapped to a combination of strokes and strokes.

The letter areas may be configured as rectangular areas surrounding their respective letters. Although not limited thereto, the letter area may be configured to have substantially the same coordinate value as the bounding box corresponding to its respective letter.

The display device may identify the letter area while simultaneously obtaining the coordinate value for each letter area. For example, the X-axis minimum value, the Y-axis minimum value, the X-axis maximum value, and the Y-axis maximum value of the letter area may be obtained as coordinate values, and the position and size of the letter area may be defined by these coordinate values.

In operation 220, the display device may receive a stroke input to the touchscreen.

The stroke input is a type of touch input to the touchscreen. The stroke input may be a kind of touch-and-drag input where the touch continues from the start point to the end point. If the stroke input is received, the display device may display a line over the touch section that is continuously maintained from the start point of the touch input to the end point of the touch input.

If the stroke input is applied, the display device may obtain a coordinate value for the start point of the stroke input, a coordinate value for the end point of the stroke input, and a coordinate value for the section where the stroke input is applied. In other words, the display device may obtain coordinate values associated with the stroke input, and identify the position where the stroke input is input based on the obtained coordinate values.

In operation 230, the display device may set the letter areas where the stroke input is received as the area of interest based on reception of the stroke input in the letter areas.

The display device may identify the positions of the letter areas and the position where the stroke input is received. The display device may identify the letter areas where the stroke input is received among the letter areas, and set the letter areas where the stroke input is received as the area of interest. The area of interest and the letter area have substantially the same position and size, but there is a difference that a line input (e.g., a shading line input or a solid line input) may be displayed in at least a portion of the area of interest, which is described below.

The areas of interest identified based on the stroke input may include a start area of interest, an intermediate area of interest, and a last area of interest. The start area of interest may correspond to the letter area where the start point of the stroke input is received, and the last area of interest may correspond to the letter area where the end point of the stroke input is received. The intermediate area of interest may be positioned between the start area of interest and the last area of interest and may correspond to one or more letter areas where stroke input is received.

In operation 240, the display device may identify a first area element where the start point of the stroke input is applied in the start area of interest positioned at the start point of the stroke input, and a second area element where the end point of the stroke input is applied in the last area of interest positioned at the end point of the stroke input.

The letter area and the area of interest may include at least one of an upper area element, an intermediate area element, a lower area element, and a bottom element. The display device may identify the position of the stroke input, and may identify the area element (e.g., the upper area element, the intermediate area element, the lower area element, and the bottom area element) where the stroke input is received, based on the identified position.

The area element of the area of interest where the line input is to be generated may be determined based on which area element the stroke input applied to the letter area is applied. For example, If a stroke input is received at the lower area element of the letter area, the line input may be generated to pass through the lower area element of the area of interest corresponding to the letter area. For example, If a stroke input is received at the intermediate area element of the letter area, the line input may be generated to pass through the intermediate area element of the area of interest corresponding to the letter area.

Operation 240 may be performed by the display device immediately after or simultaneously with operation 230.

In operation 250, a line input starting from the first area element of the start area of interest to the second area element of the last area of interest may be generated.

According to one or more embodiments, the line input may be generated to pass through any one of the first area element or the second area element of one or more intermediate areas of interest positioned between the start area of interest and the last area of interest. Accordingly, the line input may continue from the start area of interest to the last area of interest. According to one or more embodiments, the line input may be represented as a straight line over the first area element and the second area element set for the line input to pass, and may be represented as a straight line, a curve, or a combination thereof between neighboring areas of interest.

Although not limited thereto, according to one or more embodiments, based on the first area element where the start point of the solid line stroke input is applied being identified as one of the upper area element or the lower area element, and the second area element where the end point of the solid line stroke input is applied being identified as the other one of the upper area element or the lower area element, the display device may display the solid line stroke input on the touchscreen without displaying the solid line stroke input. For example, the intermediate area element may be present between the upper area element and the lower area element and is spaced apart from each other, and the line input for connecting these area elements may not match the user's intention to generate the line input. Accordingly, the display device may be configured to display the stroke input as it is on the display device without displaying the line input described in one or more embodiments of the disclosure.

According to one or more embodiments of the disclosure, various representation methods may be implemented depending on whether the line input is a shading line input or a solid line input.

The first area element of the start area of interest is a first area element of the letter area where the start point of the stroke input is applied, and the second area element of the last area of interest is a second area element of the letter area where the end point of the stroke input is applied.

According to one or more embodiments of the disclosure, the stroke input may include a shading stroke input and a solid line stroke input. Shade stroke input means a stroke input displaying shading having a predetermined thickness, and solid line stroke input means a stroke input displaying a solid line. If a shading stroke input is received in the letter areas, the line input to be generated may be set as a shading line input. If a solid line stroke input is received in the letter areas, the line input to be generated may be set as a solid line input. In other words, the stroke input and the line input may have substantially the same display attribute (e.g., shading or solid line).

According to one or more embodiments, If the stroke input received in the letter areas is a shading stroke input, the shading line input may have substantially the same line thickness as the shading stroke input. Further, although not limited thereto, the line thickness of the shading line input may remain substantially the same from the first area element of the start area of interest to the second area element of the last area of interest. Accordingly, the user may display a line input having substantially the same line thickness as a preset line thickness for a stroke input, on the letter area.

The shading line input in the disclosure may have a shading where the width is extended by the same length in the upper and lower directions of the central line. In other words, the line thickness of the shading line input is the sum of the upper thickness and the lower thickness based on the central line, and the upper thickness and the lower thickness may be set to be substantially the same. The central line of the shading line input may be set to pass through the central axis of the first area element of the start area of interest and the central axis of the second area element of the last area of interest. The central axis refers to a reference axis passing through a center point of each area element (e.g., the first area element and the second area element) in the X-axis direction with respect to the Y-axis. The central axis may be set to differ depending on the position and size of the letter area.

According to one or more embodiments of the disclosure, If the stroke input received in the letter areas is a shading stroke input, in the first area element or the second area element set to allow the shading line input to pass there-through, the shading line input may be generated to at least partially or entirely fill the first area element or the second area element. In this case, the line thickness of the shading stroke input may be determined based on the width of the first area element or the second area element. For example, If the width of the first area element or the second area element to be filled with the shading line input is large, the line thickness of the shading line input may increase. For example, If the width of the first area element or the second area element to be filled with the shading line input is small, the line thickness of the shading line input may decrease. In the case of handwriting, the size may vary from letter to letter, and if the shading line input is applied equally, emphasis on the letter initially intended by the user may not be achieved. By changing the line thickness of the shading line input according to the size of the letter, specifically, the size of the area element where the stroke input is applied, it is possible to provide a shading line input suitable for the size of the letter even without cumbersome line thickness resetting.

According to one or more embodiments of the disclosure, if the stroke input received in the letter areas is a solid line stroke input, the solid line input may have substantially the same line thickness as the solid line stroke input. The thickness of the solid line input may remain substantially the same from the first area element of the start area of interest to the second area element of the last area of interest.

According to one or more embodiments, the display device may generate the solid line input to pass through the bottom area element, based on the first area element where the start point of the solid line stroke input is applied and the second area element where the end point of the solid line stroke input is applied being identified as the lower area element. In other words, even if the stroke input is applied to the lower area element, the display device may generate a line input in the bottom area element rather than the lower area element. Inputting a solid line stroke input under a letter may reflect the user's intention to underline the letter to emphasize the letter. However, if the user is restricted to input a solid line stroke input exactly to the bottom area element, underlining may be inconvenient. Accordingly, the display device may extend the function as the stroke input receiving means of the bottom area element to the lower area element and allow the bottom area element to instead function as the line input display means of the lower area element, allowing the user to more easily input an underline.

According to one or more embodiments, the display device may map checker information to a solid line input based on the first area element where the start point of the solid line stroke input is applied and the second area element where the end point of the solid line stroke input is applied being identified as intermediate area elements. If the stroke input is applied to the intermediate area elements of the start area of interest and the last area of interest, the user's intention may be determined as displaying a strike-through. Accordingly, to allow information about the checker displaying the strike-through to be automatically recorded in the document, the display device may map the information about the checker generating the solid line input to the solid line input based on the solid line input, e.g., strike-through, being generated, thereby allowing for an easier check by the checker in the future. In this case, the line inputs jointly passing through the intermediate area elements of the areas of interest may be generated as a double line.

In operation 260, the display device may display the generated line input on the touchscreen.

According to one or more embodiments, the display device may display a preview for the line input. The preview of the line input may be displayed on the touchscreen together with the stroke input. Specifically, while displaying the generated line input on the touchscreen, the display device may simultaneously display the stroke input and the line input on the touchscreen while the stroke input on the touchscreen is maintained until the end point of the stroke input. The display device may display the line input on the touchscreen based on the stroke input being stopped, but may omit the stroke input on the touchscreen.

Figure 3:
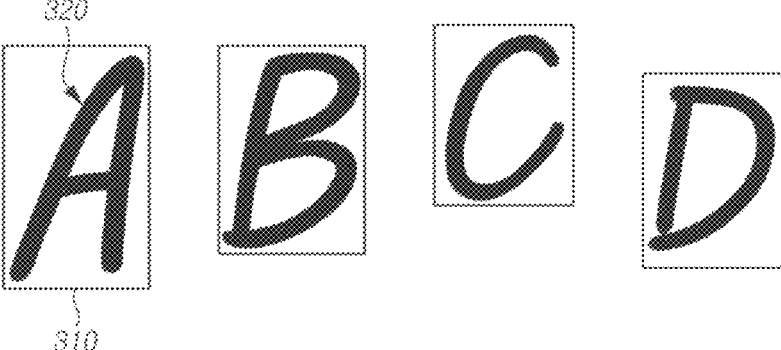
FIG. 3 is a view illustrating an example of recognizing a letter area, according to one or more embodiments of the disclosure.

FIG. 3 is a view illustrating an example of recognizing a letter area, according to one or more embodiments of the disclosure.

The letter areas may be identified by the display device. The display device may be substantially the same as the display device 100 of FIG. 1. The operation of identifying the letter areas may be understood by referring to operation 210 of FIG. 2.

Referring to FIG. 3, four letters 320, such as A, B, C, and D, may be displayed on the touchscreen. The display device may identify each of the eight letters A, B, C, D, E, F, G, and H, and may identify the letter areas 310 respectively corresponding to the letters 320. The letters 320 may include not only handwritten letters but also letters recognized by an identification means, such as OCR.

Figure 4:
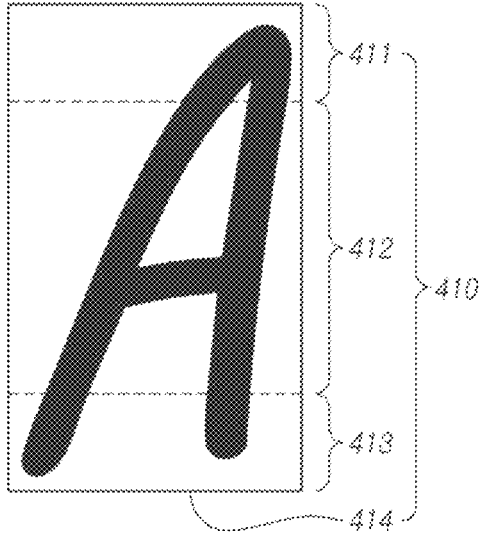
FIG. 4 is a view illustrating an example of area elements of a letter area, according to one or more embodiments of the disclosure.

FIG. 4 is a view illustrating an example of area elements of a letter area, according to one or more embodiments of the disclosure.

Referring to FIG. 4, a letter area 410 (e.g., the letter area where A is written) corresponding to one of the letter areas 310 of FIG. 3 is illustrated. One letter area 410 may include at least one of an upper area element 411, an intermediate area element 412, a lower area element 413, and a bottom area element 414. The upper area element 411, the intermediate area element 412, the lower area element 413, and the bottom area element 414 may be sequentially arranged downward.

The upper area element 411, the intermediate area element 412, and the lower area element 413 may be rectangular areas having a predetermined size. The upper area element 411, the intermediate area element 412, and the lower area element 413 each have substantially the same coordinate value with respect to the X-axis, and may be sequentially arranged with respect to the Y-axis. The intermediate area element 412 may be set to have a larger width than the upper area element 411 and/or the lower area element 413. However, the disclosure is not limited thereto, and the lower area element 413 may be set to have the largest width.

The bottom area element 414 may be a straight line area having a predetermined length. Unlike the other area elements (e.g., the upper area element 411, the intermediate area element 412, or the lower area element 413), the bottom area element 414 may be set as a line rather than a plane. The bottom area element 414 may be the bottom side of the area of interest, e.g., the lower area element 413.

The letter areas and the areas of interest may be set to have substantially the same position and size. Each of the areas of interest is a letter area where a stroke input is received, and may include at least one of an upper area element, an intermediate area element, a lower area element, and a bottom area element as does the letter area in substantially the same manner. The area elements (e.g., the upper area element, the intermediate area element, the lower area element, and the bottom area element) constituting each of the areas of interest may be set to have substantially the same position and size as the area elements included in the letter area. As such, the description of the above-described letter areas may be applied to the areas of interest in substantially the same manner.

An example of how a line input is displayed in an area of interest when various stroke inputs are applied to the letter areas is described below. The letter area where the start point of the stroke input is input may be set as the start area of interest, and the letter area where the end point of the stroke input is input may be set as the last area of interest. Further, except for the start area of interest and the last area of interest, the letter areas positioned on the trajectory of the stroke input are set as intermediate areas of interest.

Figure 5:
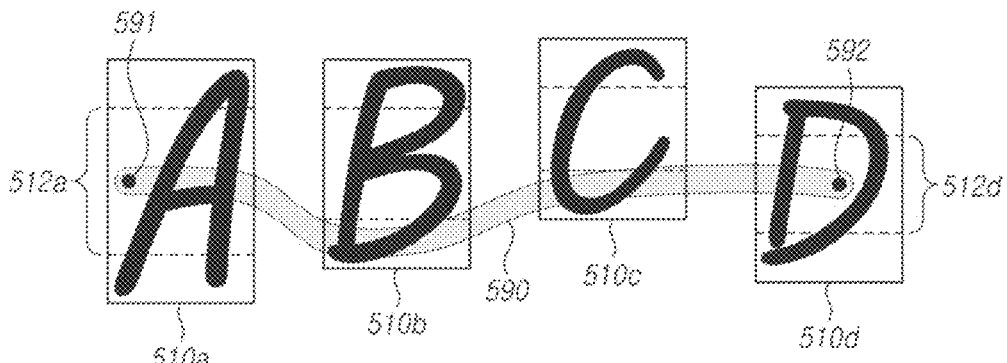
FIG. 5 is a view illustrating an example of applying a shading stroke input to a letter area, according to one or more embodiments of the disclosure.

FIG. 5 is a view illustrating an example of applying a shading stroke input to a letter area, according to one or more embodiments of the disclosure.

Referring to FIG. 5, the input of the shading stroke input 590 starts in the A letter area 510a corresponding to the letter A, and the shading stroke input 590 ends in the D letter area 510d corresponding to the letter D. The start point 591 of the stroke input 590 is positioned in the A letter area 510a, and the A letter area 510a is set as the start area of interest. The end point 592 of the stroke input 590 is positioned in the D letter area 510d, and the D letter area 510d is set as the last area of interest. Also, the B and C letter areas 510b and 510c respectively corresponding to B and C positioned between A and D are set as intermediate areas of interest.

The display device may identify that the shading stroke input 590 in the A letter area 510a and the shading stroke input 590 in the D letter area 510d are input to the intermediate area elements 512a and 512d. According to the embodiments described above with reference to FIG. 2, area elements of areas of interest where a shading line input is to be generated may be determined as intermediate area elements.

Figure 6:
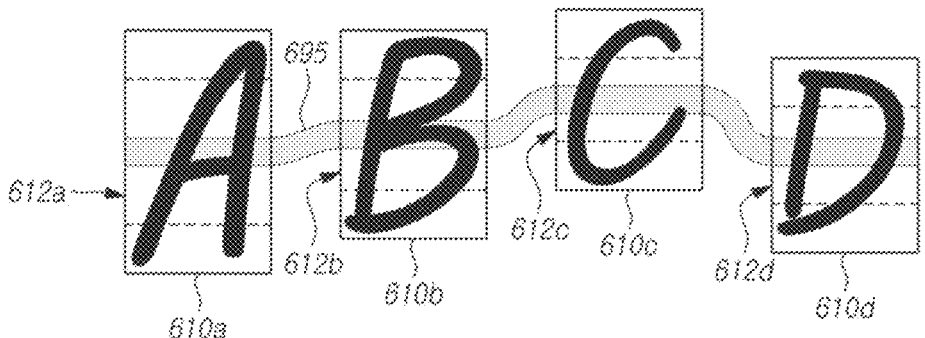
FIGS. 6 and 7 are views illustrating an example of displaying a line input as a result of applying a stroke representing the shading of FIG. 5, according to one or more embodiments of the disclosure.
Figure 7:
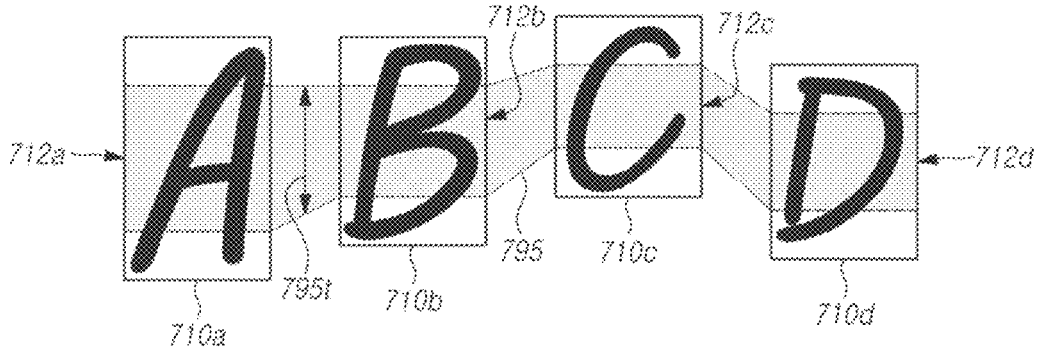

FIGS. 6 and 7 are views illustrating an example of displaying a line input as a result of applying a stroke representing the shading of FIG. 5, according to one or more embodiments of the disclosure.

Referring to FIG. 6, the shading line input 695 may be formed to have substantially the same line thickness as the shading stroke input (e.g., 590 of FIG. 5). The shading line input 695 may be generated as a straight line on the intermediate area elements 612a to 612d, and may be generated as a straight line, a curve, or a combination thereof between the intermediate area elements 612a to 612d neighboring each other. As such, the display device may display the shading line input 695 as the corrected line input in the letter areas, e.g., the areas of interest 610a to 610d.

Referring to FIG. 7, the line thickness 795t of the shading line input 795 may be generated adaptively to the size of each of the areas of interest 710a to 710d. For example, the line thickness 795t of the shading line input 795 may be set to fill the intermediate area elements 712a to 712d of the areas of interest 710a to 710d where the stroke input is input. FIG. 7 illustrates an example where the shading line input 795 fills all of the intermediate area elements 712a to 712d of the areas of interest 710a to 710d, but embodiments of the disclosure are not limited thereto, and the shading line input 795 may be set to fill the area element by a predetermined ratio.

FIGS. 5 to 7 illustrate an example where a stroke input representing shading is applied to an intermediate area element of a letter area, but embodiments of the disclosure are not limited thereto, and even if a shading stroke input is applied to an upper area element or a lower area, the stroke input may be processed in substantially the same manner.

Figure 8:
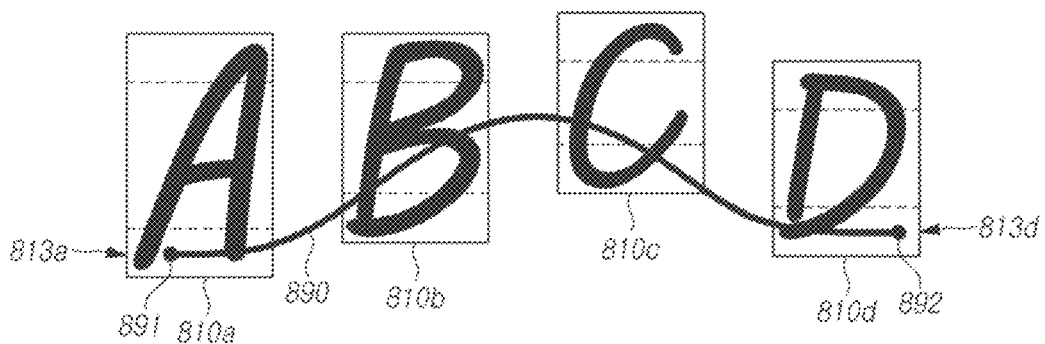
FIG. 8 is a view illustrating an example of applying a sold line stroke input to a letter area, according to one or more embodiments of the disclosure.

FIG. 8 is a view illustrating an example of applying a sold line stroke input to a letter area, according to one or more embodiments of the disclosure. Specifically, FIG. 8 is a view illustrating an example where a solid line stroke input is applied to a lower area element of a letter area.

Referring to FIG. 8, an input of a solid line stroke input 890 starts in the A letter area 810a corresponding to the letter A, and the solid line stroke input 890 ends in the D letter area 810d corresponding to the letter D. The A letter area 810a is set as the start area of interest, and the D letter area 810d is set as the last area of interest. Also, the B and C letter areas 810b and 810c respectively corresponding to B and C positioned between A and D are set as intermediate areas of interest.

The display device may identify that the start point 891 of the solid line stroke input 890 in the A letter area 810a and the end point 892 of the solid line stroke input 890 in the D letter area 810d are input to the lower area elements 813a and 813d. According to the embodiments described above with reference to FIG. 2, an area element of areas of interest where a solid line input is to be generated may be determined as a lower area element.

Figure 9:
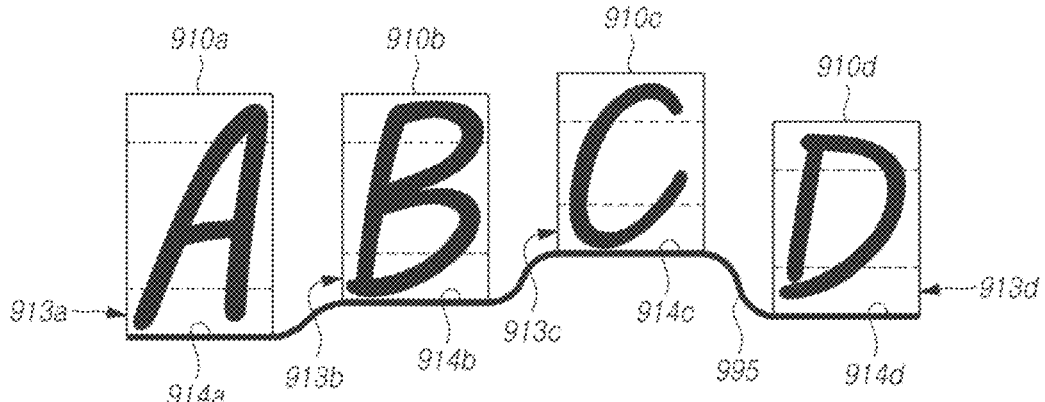
FIG. 9 is a view illustrating an example of displaying a line input as a result of applying the solid line stroke input of FIG. 8, according to one or more embodiments of the disclosure.

FIG. 9 is a view illustrating an example of displaying a line input as a result of applying the solid line stroke input of FIG. 8, according to one or more embodiments of the disclosure.

Referring to FIG. 9, the solid line input 995 may be generated on the lower area elements 914a to 914d. As described above with reference to FIG. 2, If a solid line stroke input (e.g., the stroke input 890 of FIG. 8) is commonly applied to the lower area elements 913a to 913d of the start area of interest and the last area of interest, the solid line input 995 may be generated to extend along the lower area elements 914a to 914d rather than the lower area elements 913a to 913d.

The solid line input 995 may be formed to have substantially the same line thickness as the solid line stroke input. The solid line input 995 may be generated in a straight line on the lower area elements 914a to 914d, and may be generated in a straight line, a curved line, or a combination thereof between the lower area elements 914a to 914d adjacent to each other. As such, the display device may display the corrected line input on the letter areas, e.g., the areas of interest.

Figure 10:
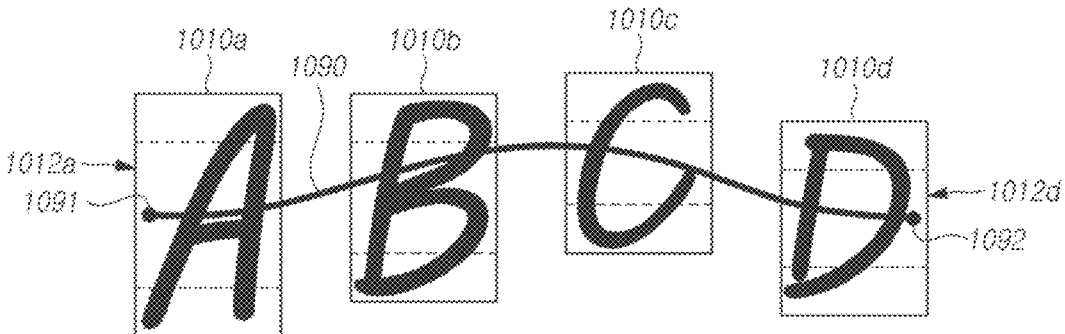
FIG. 10 is a view illustrating an example of applying a sold line stroke input to a letter area, according to one or more embodiments of the disclosure.

FIG. 10 is a view illustrating an example of applying a sold line stroke input to a letter area, according to one or more embodiments of the disclosure. Specifically, FIG. 10 is a view illustrating an example where a solid line stroke input is applied to an intermediate area element of a letter area.

Referring to FIG. 10, an input of a solid line stroke input 1090 is started in a letter A area 1010a corresponding to letter A, and a solid line stroke input 1090 is terminated in a letter B area 1010d corresponding to letter D. The A letter area 1010a is set as the start area of interest, and the D letter area 1010d is set as the last area of interest. Also, the B and C letter areas 1010b and 1010c respectively corresponding to B and C positioned between A and D are set as intermediate areas of interest.

The display device may identify that the start point 1091 of the solid line stroke input 1090 in the A letter area 1010a and the end point 1092 of the solid line stroke input 1090 in the D letter area 1010d are input to the intermediate area elements 1012a to 1012d. According to the embodiments described above with reference to FIG. 2, the area elements of the areas of interest where the solid line input is to be generated may be determined as the intermediate area elements 1012a to 1012d.

Figure 11:
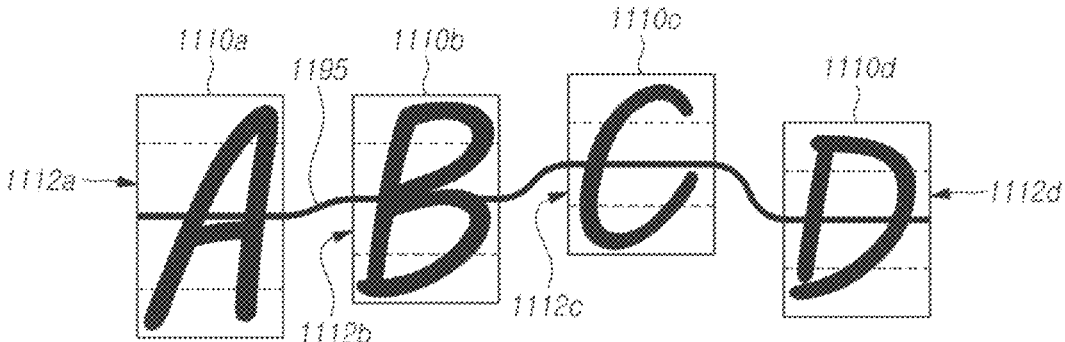
FIG. 11 is a view illustrating an example of displaying a line input as a result of applying the sold line stroke input of FIG. 10, according to one or more embodiments of the disclosure.

FIG. 11 is a view illustrating an example of displaying a line input as a result of applying the sold line stroke input of FIG. 10, according to one or more embodiments of the disclosure.

Referring to FIG. 11, the solid line input 1195 may be formed to have substantially the same line thickness as the solid line stroke input (e.g., the solid line stroke input 1090 of FIG. 10). The solid line input 1195 may be generated in a straight line on the intermediate area elements 1112a to 1112d, and may be generated in a straight line, a curved line, or a combination thereof between the intermediate area elements 1112a to 1112d adjacent to each other. As such, the display device may display the corrected line input on the letter areas, e.g., the areas of interest.

The examiner information may be mapped to the solid line input 1195 generated to extend along the intermediate area elements 1112a to 1112d. Accordingly, If viewing the document later, the examiner information of the user who generated the solid line input 1195 may be checked. Also, the solid line input 1195 generated to extend along the intermediate area elements 1112a to 1112d may be displayed as a double line.

A device according to one or more embodiments of the disclosure may be described as follows.

A display device according to an embodiment of the disclosure comprises a display having a touchscreen and one or more processors electrically connected with the display. The one or more processors are configured to identify letter areas corresponding to letters represented on the touchscreen, set letter areas where a stroke input is received as areas of interest based on receiving the stroke input on the letter areas through the touchscreen, identify a first area element where a start point of the stroke input is applied in a start area of interest, where the start point of the stroke input is positioned, among the areas of interest, and a second area element where an end point of the stroke input is applied in a last area of interest, where the end point of the stroke input is positioned, among the areas of interest, generate a line input continuing from the first area element of the start area of interest to the second area element of the last area of interest, the line input being generated to pass through a first area element or a second area element of one or more intermediate areas of interest positioned between the start area of interest and the last area of interest, and display the generated line input on the touchscreen.

According to an embodiment of the disclosure, the letter areas may be configured as rectangular areas surrounding their respective letters.

According to an embodiment of the disclosure, the start area of interest, one or more intermediate areas of interest, and last area of interest of the letter areas may include one or more area elements. The one or more area elements may include at least one of an upper area element, an intermediate area element, a lower area element, and a bottom area element.

According to an embodiment of the disclosure, each of the first area element of the start area of interest, the first area element or second area element of the one or more intermediate areas of interest, or the second area element of the last area of interest may be identified as one of an upper area element, an intermediate area element, a lower area element, or a bottom area element.

According to an embodiment of the disclosure, the stroke input received on the touchscreen may include one of a shading stroke input or a solid line stroke input. If the shading stroke input is received in the letter areas, the line input may be set as a shading line input and, if the solid line stroke input is received in the letter areas, the line input may be set as a solid line input.

According to an embodiment of the disclosure, when the stroke input received in the letter areas is the shading stroke input, the shading line input may have substantially the same line thickness as the shading stroke input. The line thickness of the shading line input may remain substantially the same from the first area element of the start area of interest to the second area element of the last area of interest.

According to an embodiment of the disclosure, the shading line input may be set to have a line thickness extended by the same length in upper and lower directions of a central line. The central line may be set to pass through a central axis of the first area element of the start area of interest and a central axis of the second area element of the last area of interest.

According to an embodiment of the disclosure, when the stroke input received in the letter areas is the shading stroke input, the shading line input may be generated to at least partially fill the first area element or the second area element in the first area element or second area element set to allow the shading line input to pass therethrough.

According to an embodiment of the disclosure, when the stroke input received in the letter areas is the solid line stroke input, the solid line input may have substantially the same thickness as the solid line stroke input, and the thickness of the solid line input may remain substantially the same from the first area element of the start area of interest to the second area element of the last area of interest.

According to an embodiment of the disclosure, the processor may generate the solid line input to pass through the bottom area element of each of the areas of interest based on the first area element where the start point of the solid line stroke input is applied and the second area element where the end point of the solid line stroke input is applied being identified as the lower area element.

According to an embodiment of the disclosure, the processor may map checker information to the solid line input based on the first area element where the start point of the solid line stroke input is applied and the second area element where the end point of the solid line stroke input is applied being identified as the intermediate area element.

According to an embodiment of the disclosure, the processor may display the solid line stroke input on the touchscreen, without displaying the solid line input, based on the first area element where the solid line stroke input is applied being identified as any one of the upper area element or the lower area element and the second area element where the end point of the solid line stroke input is applied being identified as a remaining one of the upper area element or the lower area element.

According to an embodiment of the disclosure, the processor may, in displaying the generated line input on the touchscreen, simultaneously display the stroke input and the line input on the touchscreen while the stroke input on the touchscreen is maintained to the end point of the stroke input.

According to an embodiment of the disclosure, the processor may display the line input on the touchscreen, with the stroke input omitted from the touchscreen, based on the stroke input being stopped.

According to an embodiment of the disclosure, the line input may be represented as a straight line in the first area element of the start area of interest, any one of the first area element or second area element of the one or more areas of interest, and the second area element of the last area of interest, set to allow the line input to pass therethrough, and may be represented as a straight line, a curve, or a combination thereof between neighboring areas of interest.

The electronic device according to one or more embodiments may be one of various types of electronic devices. The electronic devices may include, for example, a display device, a portable communication device (e.g., a smartphone), a computer device, a portable multimedia device, a portable medical device, a camera, a wearable device, or a home appliance. The electronic devices according to an embodiment are not limited to those described above.

It should be appreciated that one or more embodiments of the disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, and may interchangeably be used with other terms, for example, "logic," "logic block," "part," or "circuitry". A part or module may be a single integral component, or a minimum unit or part thereof, adapted to perform one or more functions. For example, according to an embodiment, 'part' or 'module' may be implemented in a form of an application-specific integrated circuit (ASIC).

As used in the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the electronic device described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities. Some of the plurality of entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A display device, comprising:

a display including a touchscreen; and at least one processor operatively connected with the display, wherein the at least one processor is configured to:

identify three or more letter areas corresponding to letters provided on the touchscreen, each letter area surrounding a corresponding letter;

based on receiving a stroke input on the three or more letter areas through the touchscreen, select three or more interest areas from the three or more letter areas, wherein the three or more interest areas are letter areas, where the stroke input is received on, from among the three or more letter areas;

identify a start area corresponding to a start point of the stroke input among the three or more interest areas;

identify a last area corresponding to an end point of the stroke input among the three or more interest areas;

generate a line input continuing from the start area to the last area, the line input being generated to pass through one or more intermediate areas positioned between the start area and the last area among the three or more interest areas; and control the display to display the generated line input on the touchscreen, and wherein the three or more interest areas include the start area, the last area and the one or more intermediate areas.

2. The display device of claim 1, wherein the at least one processor is further configured to identify the letter areas as rectangular areas surrounding respective letters.

3. The display device of claim 1, wherein each of the three or more interest areas includes an upper area element, an intermediate area element, a lower area element, and a bottom area element, wherein the start point of the stroke input corresponds to a first area element of the start area, and the end point of the stroke input corresponds to a second area element of the last area, wherein the line input is generated to pass through one or more third area elements corresponding respectively to the one or more intermediate areas based on at least one of the first area element or the second area element, wherein the first area element is identified as one of the upper area element, the intermediate area element, the lower area element, or the bottom area element, wherein the second area element is identified as one of the upper area element, the intermediate area element, the lower area element, or the bottom area element, and wherein each of the one or more third area elements corresponds to an area element identified for the first area element or the second area element.

4. The display device of claim 3, wherein the stroke input received on the touchscreen comprises one of a shading stroke input or a solid line stroke input, and wherein the at least one processor is further configured to, to:

based on receiving the shading stroke input in the letter areas, set the line input as a shading line input; and based on receiving the solid line stroke input in the letter areas, set the line input as a solid line input.

5. The display device of claim 4, wherein the at least one processor is further configured to, based on the stroke input received in the letter areas being the shading stroke input, identify the shading line input as having a line thickness that is the same as the line thickness of the shading stroke input, and wherein the line thickness of the shading line input is the same from the first area element of the start area to the second area element of the last area.

6. The display device of claim 4, wherein the at least one processor is further configured to:

based on the stroke input received in the letter areas being the shading stroke input, identify the shading line input as having the same line thickness as the shading stroke input, set the shading line input to have a line thickness extended by the same length in upper and lower directions of a central line, and set the central line to pass through a central axis of the first area element of the start area and a central axis of the second area element of the last area.

7. The display device of claim 4, wherein the at least one processor is further configured to, based on the stroke input received in the letter areas being the shading stroke input, generate the shading line input to at least partially fill the one or more third area elements set to allow the shading line input to pass through.

8. The display device of claim 4, wherein the at least one processor is further configured to, based on the stroke input received in the letter areas being the solid line stroke input, identify the solid line input as having a same thickness as the solid line stroke input, and identify the thickness of the solid line input as being the same from the first area element of the start area to the second area element of the last area.

9. The display device of claim 4, wherein the at least one processor is further configured to generate the solid line input to pass through the bottom area element of each of the three or more interest areas based on the first area element where the start point of the solid line stroke input is applied and the second area element where the end point of the solid line stroke input is applied being identified as the lower area element.

10. The display device of claim 4, wherein the at least one processor is further configured to map checker information to the solid line input based on the first area element where the start point of the solid line stroke input is applied and the second area element where the end point of the solid line stroke input is applied being identified as the intermediate area element.

11. The display device of claim 4, wherein the at least one processor is further configured to control the display to display the solid line stroke input on the touchscreen, without displaying the solid line input, based on the first area element where the solid line stroke input is applied being identified as any one of the upper area element or the lower area element and the second area element where the end point of the solid line stroke input is applied being identified as a remaining one of the upper area element or the lower area element.

12. The display device of claim 1, wherein the at least one processor is further configured to, in displaying the generated line input on the touchscreen, control the display to display the stroke input and the line input on the touchscreen while the stroke input on the touchscreen is maintained to the end point of the stroke input.

13. The display device of claim 12, wherein the at least one processor is further configured to control the display to display the line input on the touchscreen, with the stroke input omitted from the touchscreen, based on the stroke input being stopped.

14. The display device of claim 3, wherein the at least one processor is further configured to control the display to represent the line input as a straight line in the first area element of the start area, the one or more third area elements of the one or more intermediate areas, and the second area element of the last area, and represent the line input as the straight line, a curve, or a combination of the straight line and the curve, between the three or more interest areas that are adjacent.

15. A method for providing a corrected stroke input by a display device, the method comprising:

identifying three or more letter areas corresponding to letters provided on a touchscreen, each letter area surrounding a corresponding letter;

based on receiving a stroke input on the three or more letter areas through the touchscreen, selecting the three or more interest areas from the three or more letter areas, wherein the three or more interest areas are letter areas, where the stroke input is received on, from among the three or more letter areas;

identifying a start area corresponding to a start point of the stroke input among the three or more interest areas, and a last area corresponding to an end point of the stroke input among the three or more interest areas;

generating a line input continuing from the start area to the last area, the line input being generated to pass through one or more intermediate areas positioned between the start area and the last area among the three or more interest areas; and displaying the generated line input on the touchscreen, wherein the three or more interest areas include the start area, the last area and the one or more intermediate areas.

16. A display device, comprising:

at least one memory configured to store instructions; and at least one processor configured to execute the instructions to:

identify three or more letter areas corresponding to letters provided on a touchscreen, each letter area surrounding a corresponding letter;

based on receiving a stroke input on the three or more letter areas through the touchscreen, select three or more interest areas from the three or more letter areas, wherein the three or more interest areas are letter areas, where the stroke input is received on, from among the three or more letter areas;

identify a start area corresponding to a start point of the stroke input among the three or more interest areas;

identify a last area corresponding to an end point of the stroke input among the three or more interest areas;

generate a line input continuing from the start area to the last area, the line input being generated to pass through one or more intermediate areas positioned between the start area and the last area among the three or more interest areas; and control a display to display the generated line input on the touchscreen, wherein the three or more interest areas include the start area, the last area and the one or more intermediate areas.

17. The display device of claim 16, wherein the at least one processor is further configured to identify the letter areas as rectangular areas surrounding respective letters.

18. The display device of claim 16, wherein each of the three or more interest areas includes an upper area element, an intermediate area element, a lower area element, and a bottom area element, wherein the start point of the stroke input corresponds to a first area element of the start area, and the end point of the stroke input corresponds to a second area element of the last area, wherein the line input is generated to pass through one or more third area elements corresponding respectively to the one or more intermediate areas based on at least one of the first area element or the second area element, wherein the first area element is identified as one of the upper area element, the intermediate area element, the lower area element, or the bottom area element, wherein the second area element is identified as one of the upper area element, the intermediate area element, the lower area element, or the bottom area element, and wherein each of the one or more third area elements corresponds to an area element identified for the first area element or the second area element.

19. The display device of claim 18, wherein the stroke input received on the touchscreen comprises one of a shading stroke input or a solid line stroke input, and wherein the at least one processor is further configured to:

based on receiving the shading stroke input in the letter areas, set the line input as a shading line input; and based on receiving the solid line stroke input in the letter areas, set the line input as a solid line input.

20. The display device of claim 19, wherein the at least one processor is further configured to:

based on the stroke input received in the letter areas being the shading stroke input, identify the shading line input as having a line thickness that is the same as the line thickness of the shading stroke input, and wherein the line thickness of the shading line input is the same from the first area element of the start area to the second area element of the last area.

* * * * *